United States Patent [19]

van Klinken et al.

[11] 3,965,041

[45] June 22, 1976

[54] PROCESS FOR METAL SULFIDE CATALYST PREPARATION

[75] Inventors: Jakob van Klinken; Swan T. Sie, both of Amsterdam, Netherlands

[73] Assignee: Shell Oil Company, Houston, Tex.

[22] Filed: Sept. 27, 1974

[21] Appl. No.: 509,976

[30] Foreign Application Priority Data
Nov. 14, 1973 Netherlands................... 7315573

[52] U.S. Cl................................. 252/437; 252/439
[51] Int. Cl.²................... B01J 27/14; B01J 27/02
[58] Field of Search........................... 252/439, 437

[56] References Cited
UNITED STATES PATENTS

| | | | |
|---|---|---|---|
| 3,519,573 | 7/1970 | Coe | 252/439 |
| 3,542,694 | 11/1970 | Schwettmann | 252/439 X |
| 3,563,912 | 2/1971 | Young | 252/439 X |
| 3,673,108 | 6/1972 | Schutt | 252/439 X |
| 3,850,846 | 11/1974 | Kravitz et al. | 252/439 |

FOREIGN PATENTS OR APPLICATIONS

| | | | |
|---|---|---|---|
| 1,029,304 | 5/1966 | United Kingdom | 252/439 |

*Primary Examiner*—Carl F. Dees
*Attorney, Agent, or Firm*—Ronald R. Reper

[57] ABSTRACT

A process is disclosed for the preparation of catalysts comprising sulfides of at least one metal selected from nickel, cobalt, molybdenum, and tungsten on a porous carrier, which catalysts are particularly useful in hydrocarbon conversion processes.

10 Claims, No Drawings

PROCESS FOR METAL SULFIDE CATALYST PREPARATION

BACKGROUND OF THE INVENTION

The invention relates to a process for the preparation of catalysts comprising one or more sulfides of metals selected from the group consisting of nickel, cobalt, molybdenum and tungsten on a porous carrier. The invention further relates to the use of these catalysts for the conversion of hydrocarbon mixtures.

Catalysts comprising one or more sulfides of the above-mentioned metals on a porous carrier are well-known and are used on a large scale for the conversion of sulfur-containing hydrocarbon mixtures in the presence of hydrogen. As a rule these catalysts are prepared by contacting a porous carrier with an aqueous solution of salts of the metals concerned, followed by drying, calcining and sulfiding of the composition.

According to Netherlands patent application No. 72.11116, catalysts of the above-mentioned type with improved activity for the conversion of hydrocarbon mixtures in the presence of hydrogen can be obtained, if the preparation is carried out as follows. First of all a composition is prepared comprising a porous carrier, one or more water-soluble salts of the above-mentioned metals and a specific amount of water. Subsequently, this composition is treated at a temperature below 150°C with a hydrogen sulfide-containing gas. Finally the material is heated in a hydrogen-containing gas to a temperature above 200°C. The amount of water which should be present in the composition to be treated with the hydrogen sulfide-containing gas corresponds to the amount of water present in the composition after the latter has been dried in a dry gas at 110°C, increased by 20–120% of the amount of water which the said dried composition is capable of taking up within the pores of the carrier at 20°C. In addition to the advantage that the process described in the Netherlands patent application, compared with conventional catalyst preparation methods, enables the preparation of catalysts with improved activity for the conversion of sulfur-containing hydrocarbon mixtures in the presence of hydrogen, the process enables a considerable part of the catalyst preparation to be carried out in the hydrocarbon conversion reactor as part of the start-up of the hydrocarbon conversion process in which the catalyst is applied.

The wet sulfiding technique described in said Netherlands patent application has two drawbacks. The first drawback relates to the above-mentioned embodiment of the process in which a considerable part of the catalyst preparation is carried out as part of the start-up of the hydrocarbon conversion process in which the catalyst is applied. In this embodiment considerable quantities of decomposition products originating from the metal salts find their way into the reactor system. The second drawback is of more general character and relates to the fact that the process cannot be applied to catalyst materials which have already been subjected to a calcining treatment. This is rather a serious limitation of the process, since catalyst materials are usually commercially available in calcined form.

Further research into the application of the wet sulfiding technique in the catalyst preparation has now led to the development of a process by which catalysts can be prepared, the activity of which for the conversion of hydrocarbon mixtures in the presence of hydrogen is at the same high level as that of the catalysts prepared according to the said Netherlands patent application, but which process does not have the drawbacks described above.

SUMMARY OF THE INVENTION

The invention relates to a process for the preparation of catalysts comprising one or more sulfides of metals from the group consisting of nickel, cobalt, molybdenum and tungsten on a porous carrier, wherein a composition which contains one or more of the above-mentioned metals on a porous carrier and which has been calcined at a temperature between 175°C and 700°C with decomposition of at least part of the metal salts used for applying the metals to the carrier, is wetted with water, in which the wetted composition is subsequently with a hydrogen sulfide-containing gas at a temperature below 150°C, the material is finally heated to a final temperature above 200°C, the amount of water used for wetting the calcined composition corresponds to 20–120% of the amount of water the composition is capable of taking up within the pores of the carrier at 20°C after being wetted with water and dried in a dry gas at 110°C; if the calcined composition has a combined nickel and cobalt content of less than 4 parts by weight per 100 parts by weight of carrier, the calcination of the composition has taken place at a temperature of at most 600°C.

DESCRIPTION OF PREFERRED EMBODIMENTS

In this process the starting composition used is one which contains one or more metals of the group consisting of nickel, cobalt, molybdenum and tungsten on a porous carrier and is calcined at a temperature between 175°C and 700°C, in which at least part of the metal salts used for the application of the metals on the carrier, is decomposed. This composition is successively wetted with water, treated with a hydrogen sulfide-containing gas at a temperature below 150°C and heated to a temperature above 200°C. The amount of water which is used for wetting the calcined composition is an important parameter in the present catalyst preparation. For the preparation of catalysts with improved activity compared with catalysts prepared by the conventional dry sulfiding technique, the amount of water used for wetting the calcined composition should correspond to 20–120% of the amount of water which the composition is capable of taking up within the pores of the carrier at 20°C after being wetted with water and dried in a dry gas at 110°C. A second important parameter in the present catalyst preparation is the maximum calcining temperature to which the composition is exposed. This temperature is generally 700°C, but if the calcined composition has a combined nickel and cobalt content of less than 4 parts by weight per 100 parts by weight of carrier, care should be taken to ensure that this temperature is not more than 600°C.

Catalysts according to the present invention contain at least one sulfide of a metal selected from the group consisting of nickel, cobalt, molybdenum and tungsten. For the catalytic conversion of hydrocarbons in the presence of hydrogen, preference is given to catalysts according to the invention which contain a mixture of at least one sulfide of the metals nickel and cobalt and at least one sulfide of the metals molybdenum and tungsten. Examples of especially preferred mixed sulfidic catalysts according to the invention are catalysts comprising a combination of nickel sulfide and tungsten sulfide, catalysts comprising a combination of nickel sulfide and molybdenum sulfide and catalysts comprising a combination of cobalt sulfide and molybdenum sulfide.

The amount of metal present in the finished catalysts according to the invention may vary widely. Preference is given to catalysts comprising 0.02–0.2 gram atoms of nickel and/or cobalt and 0.04–0.4 gram atoms of molybdenum and/or tungsten per 100 of carrier. With regard to the atomic ratio in which the metals are present in the catalysts, it should be noted that preference is given to catalysts in which the atomic ratio between the metals nickel and/or cobalt on the one hand and the metals molybdenum and/or tungsten on the other is 0.2–1.0.

Depending on the conversion process for which the catalysts are used and the composition of the hydrocarbon mixture to be converted, catalysts according to the invention may in addition contain promoters such as phosphorus, boron compounds and halogen, in particular fluorine. Fluorine may be incorporated into the catalysts by impregnating the catalyst or carrier material with a fluorine compound or by in-situ fluoriding, in which during the initial phase of the process in which the catalyst is used a fluorine compound is added to the feed until the desired fluorine content in the catalyst has been reached.

In the process according to the invention the starting composition used is one which contains one or more of the above-mentioned metals on a porous carrier and which composition is calcined at a temperature between 175°C and 700°C, in which at least part of the metal salts used for applying the metals on the carrier is decomposed. This composition can be prepared very suitably by impregnating the porous carrier with one or more aqueous solutions of salts of the metals concerned. The metal salts may be applied to the carrier in one or more steps. The material is dried between the separate impregnating steps. The use of a multi-step impregnating technique may be necessary for the preparation of catalysts with a high metal content. When mixed metal sulfidic catalysts are prepared according to the present invention, the metal salts may be applied to the carrier separately or from a common solution comprising a mixture of the metal salts concerned. An attractive way of applying the metals to the carrier is the dry impregnating technique, in which the carrier is contacted with an aqueous solution of the metal salts concerned, which aqueous solution has a volume substantially equal to the pore volume of the carrier. Adsorption of the aqueous solution may be facilitated by gentle heating of the mixture. If this method is chosen for the preparation of catalysts with a high metal load, it may be necessary to carry out more than one dry impregnation treatment and to dry the material between the separate impregnating steps.

Exemplary of water-soluble nickel and cobalt salts suitable for the preparation of the present catalysts include nitrates and formates of these metals. Suitable molybdenum and tungsten salts are molybdates, such as ammonium molybdate and tungstates, such as ammonium tungstate. Heteropoly compounds of molybdenum and tungsten may be used as well.

The carrier used in the preparation of the catalysts according to the invention may be amorphous or crystalline. Examples of suitable carriers are silica, alumina, zirconia, thoria, magnesia and boria, as well as combinations thereof, such as silica-alumina, silica-magnesia, and silica-zirconia. Other suitable carriers are zeolites, such as mordenite, faujasite and zeolite-omega. Mixtures of, for example, alumina and mordenite may also be used. As carriers for the present catalysts alumina and silica-alumina are preferred. The porous carrier preferably has a surface area larger than 50 m$^2$/g and particularly larger than 100 m$^2$/g, e.g., 100–500 m$^2$/g.

In the process according to the invention the starting composition used is one which has been calcined at a temperature between 175°C and 700°C. Preference is given to compositions which have been heated at a temperature of at most 500°C during calcination. Before calcination the compositions are dried. This drying step is carried out at a temperature of at most 150°C, preferably at about 120°C. After drying, the composition is heated slowly to the maximum calcining temperature and maintained at this temperature for some time, it being possible, if desired, to maintain the composition for some time at a constant temperature in the temperature range between 175°C and the maximum calcining temperature. Heating of the dried composition to 175°C is usually effected in about 15 minutes. Heating of the composition from 175°C to the maximum calcining temperature may be carried out in various ways. It is preferred to carry out the heating of the composition to the maximum calcining temperature and the calcination by any of the following procedures.

1. The composition is heated from 175°C to the maximum calcining temperature, which is at least 300°C and preferably 450°–550°C, at a maximum rate of 1.5°C/min., and is subsequently maintained at the maximum calcining temperature for at least one hour, preferably 2–4 hours.

2. The composition is heated from 175°C to an initial calcining temperature of 275°–325°C, at a maximum rate of 1.5°C/min., and is subsequently maintained at this initial calcining temperature for at least 15 minutes, preferably at least one hour, whereupon the composition is heated from the initial calcining temperature to the maximum calcining temperature, which is 450°–550°C, and finally maintained at the maximum calcining temperature for at least one hour, preferably 2–4 hours. During the heating of the composition from the initial calcining temperature to the maximum calcining temperature a higher heating rate is preferably applied than during the preceding heating from 175°C to the first calcining temperature. This higher heating rate should, however, not exceed 8°C/min and preferably does not exceed 4°C/min.

3. The procedure is analogous to that described under 2., except that during the heating of the composition from 175°C to a temperature between 200°C and 250°C a higher heating rate is applied than during the subsequent further heating from the temperature between 200°C and 250°C to the initial calcining temperature.

In the process according to the invention the calcined composition is wetted with a specific amount of water. The amount of water used corresponds to 20–120% of the amount of water the composition is capable of taking up within the pores of the carrier at 20°C after being wetted with water and dried in a dry gas at 110°C. The amount of water which the dried composition is capable of taking up within the pores of the carrier at 20°C may easily be determined by means of an experiment in which known amounts of water are added to the dry composition at 20°C until the composition shows the first visually observable signs of wetness. In the process according to the invention the calcined composition is preferably wetted with an amount of water corresponding to 70–105% of the amount of water the composition is capable of taking up within the pores of the carrier at 20°C after being wetted with water and dried in a dry gas at 110°C. In a very suitable method for wetting the calcined composition according to the invention the calcined composition is contacted with an amount of water, the volume of which substantially corresponds to the pore volume of the composition. For wetting the calcined composition use may be made of water as such or of an aqueous solution. For wetting the calcined composition preference is given to an aqueous solution containing one or more compounds which promote the water solubility of the metals present in the calcined composition. Examples of such compounds are phosphoric acid, phosphorous acid and hydrogen peroxide. An aqueous phosphoric acid solution is preferred for wetting the calcined compositon.

In the process according to the invention the calcined composition is treated, after wetting, with a hydrogen sulfide-containing gas at a temperature below 150°C. As treating gas hydrogen sulfide itself as well as mixtures of hydrogen sulfide with hydrogen or nitrogen are very suitable. The treatment is preferably carried out at elevated pressure, in particular at a hydrogen sulfide partial pressure of from 3 to 20 bar. The treatment of the composition with the hydrogen sulfide-containing gas is preferably carried out at a temperature of from 20° to 110°C and during a period of time at of preferably from 2 to 100 hours.

After being treated in a hydrogen sulfide-containing gas at a temperature below 150°C, the composition is heated to a final temperature above 200°C. The heating of the composition to a final temperature above 200°C is preferably carried out in a hydrogen-containing gas. As hydrogen-containing gas hydrogen itself as well as mixtures containing hydrocarbons and/or hydrogen sulfide in addition to hydrogen are very suitable. Preference is given to hydrogen or hydrogen-containing mixtures to which a few per cent of hydrogen sulfide have been added as hydrogen-containing treating gas. The heating of the composition to a final temperature above 200°C is preferably carried out to a final temperature of from 300° to 450°C. After this final temperature has been reached, the composition may be kept at this temperature for a certain period of time. After this heating of the material the catalyst is ready to be used for the conversion of hydrocarbon mixtures in the presence of hydrogen. At the start of the hydrocarbon conversion process a certain quantity of fluorine may, if desired, be applied to the catalyst by in-situ fluoriding.

As already stated, the process according to the invention as well as that described in Netherlands patent application No. 72.11116, offers the possibility of carrying out a major part of the catalyst preparation in the hydrocarbon conversion reactor as part of the start-up of the hydrocarbon conversion process for which the catalyst is used. If the catalyst preparation according to the invention is carried out in this way, the calcined composition may, after wetting, be introduced into the reactor, treated with hydrogen sulfide at a temperature below 150°C and subsequently heated to the process temperature in hydrogen or in hydrogen which contains a few per cent of hydrogen sulfide. After the process temperature has been reached, the feed may be introduced into the reactor and the conversion process can take place, it being possible, if desired, to carry out a in-situ fluoriding of the catalyst.

Supported metal sulfide catalysts prepared according to the present invention are very suitable to be applied for the catalytic conversion of hydrocarbons in the presence of hydrogen. The present catalysts may e.g., be successfully applied in the first stage of a two-stage process for the production of light fuels as gasolines and kerosines by hydrocracking of heavy hydrocarbon fractions such as normal and flashed distillates, the hydrocracking of heavy hydrocarbon mixtures such as heavy distillates, deasphalted oils and slack waxes for the production of lubricating oils with a high viscosity index, the hydrogenation of aromatics present in light fuels such as kerosines to improve the smoke point thereof, the hydrodesulfurization of distillate and residual hydrocarbon fractions and the "hydrofinishing" of lubricating oils. Catalysts prepared according to the process of the invention may further be applied for the preparation of technical white oils and medicinal oils by treating with hydrogen suitable mineral oil fractions preferably extracted with a solvent for aromatics. For the preparation of technical white oils the feed may be treated with hydrogen in a one-stage process over a catalyst prepared according to the invention. For the preparation of medicinal oils the feed is suitably treated with hydrogen in a two-stage process, in which a catalyst prepared according to the invention is applied in the first stage and a supported noble metal catalyst is preferably applied in the second.

The invention will now be further elucidated with the aid of the following examples.

EXAMPLE I

In this Example the benzene hydrogenation activities of $Ni/W/Al_2O_3$ catalysts which had been calcined and sulfided by various methods and which optionally contained fluorine, are compared. The catalysts which contained 15 parts by weight of nickel and 50 parts by weight of tungsten per 100 parts by weight of alumina were prepared by impregnating an alumina carrier with an aqueous solution which contained nickel nitrate and ammonium tungstate and the volume of which corresponded to the pore volume of the carrier (dry impregnating method). After being dried at 120°C and heated from 120°C to 175°C in 15 minutes the compositions were calcined. The calcination was effected by two different methods.

Calcination method I

The composition is heated from 175°C up to 300°C in 2¾ hours and maintained at 300°C for 3 hours and subsequently heated from 300°C to 500°C in one hour and maintained at 500°C for 3 hours.

Calcination method II

The composition is heated from 175°C up to 300°C in 2¾ hours and maintained at 300°C for 3 hours, subsequently heated from 300°C to 500°C in one hour and maintained at 500°C for 3 hours and finally heated from 500°C to 700°C in one hour and maintained at 700°C for 3 hours.

The composition calcined as described above were subsequently sulfided. The sulfidation was carried out by two different methods.

Sulfiding method A (conventional)

The composition is heated to 450°C in an $H_2S/H_2$ stream (1/10 v/v, 10 bar, 25,000 Nl.l.$^{116}$ $^{1}$.h$^{-1}$) in 3½ hours and maintained in this gas stream at 450°C for 16 hours.

The reaction product was analyzed by GLC. The activity of the catalyst was expressed as the first order reaction rate constant for benzene hydrogenation in ml of benzene (ml of catalyst) $^{-1}$.h$^{-1}$.

The benzene hydrogenation activities of the various catalysts are given in Table A.

Table A

| Catalyst | 15 Ni/50 W/100 Al$_2$O$_3$ | | | | | | | |
|---|---|---|---|---|---|---|---|---|
| Calcining method | I | | | | II | | | |
| Sulfiding method | A | | B | | A | | B | |
| In-situ fluorination | no | yes | no | yes | no | yes | no | yes |
| Benzene hydrogenation activity, ml, ml$^{-1}$.h$^{-1}$ | 1.25 | 4.0 | 2.95 | 4.7 | 1.0 | 3.0 | 1.85 | 3.6 |

Sulfiding method B (according to the invention)

The composition is wetted with a quantity of an aqueous 10% phosphoric acid solution, the volume of which corresponds to the pore volume of the composition. The wetted composition is subsequently treated with $H_2S$ at 15 bar and 75°C for 16 hours and subsequently heated to 400°C in an $H_2S/H_2$ stream (1/10 v/v, 10 bar, 15,000 Nl.l.$^{-1}$.h$^{-1}$) 3½ hours.

The catalysts sulfided by the above method were tested for their activity in the hydrogenation of benzene. The catalysts were tested as such and after in-situ fluoriding to a fluorine content of 10% by weight. The in-situ fluoriding of the catalysts was effected by the addition of 350 ppmw of fluorine as ortho-fluoro toluene to the benzene feed during the first 48 hours of the benzene hydrogenation test.

The benzene hydrogenation activities of the catalysts referred to in the Examples of this patent application were determined by means of a benzene hydrogenation test, which was carried out in a microreactor with an accurately known quantity by weight of catalyst, viz. 0.5–2.0 g, which corresponded to 1.00 ml of compacted catalyst. Benzene vapor and hydrogen containing a small quantity of $H_2S$ were passed over the catalyst under the following conditions.

$T = 400°C$; $p = 46$ bar; $H_2/C_6H_6$ mol. ratio = 20.

Table A shows that catalysts sulfided according to the invention (sulfiding method B) have a higher benzene hydrogenation activity than catalysts sulfided by the conventional method (sulfiding method A). This applies both to in-situ fluorided catalysts and to non-fluorided catalysts. Table A further shows that catalysts calcined to 700°C (calcining method II) have a lower benzene hydrogenation activity than catalysts calcined to 500°C (calcining method I). This applies both to in-situ fluorided catalysts and non-fluorided catalysts as well as to catalysts sulfided according to the invention and conventionally sulfided catalysts.

EXAMPLE II

In this Example the benzene hydrogenation activities of Ni/W/Al$_2$O$_3$ catalysts with different nickel content are compared. The catalysts were calcined and sulfided by different methods and contained or did not contain fluorine. In addition to the 15 Ni/50 W/100 Al$_2$O$_3$ catalysts already described in Example I, 3 Ni/50 W/100 Al$_2$O$_3$ and 5 Ni/50 W/100 Al$_2$O$_3$ catalysts were tested. The preparation, calcination, sulfiding in in-situ fluoriding of these catalysts proceeded as described in Example I for the 15 Ni/50 W/100 Al$_2$O$_3$ catalysts.

The benzene hydrogenation activities of the various catalysts are shown in Table B.

Table B

| Catalyst | Calcining method | Sulfiding method | In-situ fluorination | Benzene hydrogenation activity ml.ml$^{-1}$.h$^{-1}$ |
|---|---|---|---|---|
| 3 Ni/50 W/100 Al$_2$O$_3$ | I | A | no | 1.7 |
| | | | yes | — |
| | | B | no | 2.4 |
| | | | yes | 3.4 |
| | II | A | no | 0.95 |
| | | | yes | 2.0 |
| | | B | no | 0.85 |
| | | | yes | 1.5 |
| 5 Ni/50 W/100 Al$_2$O$_3$ | I | A | no | 1.4 |
| | | | yes | — |
| | | B | no | 3.1 |
| | | | yes | 4.25 |
| | II | A | no | 1.1 |
| | | | yes | — |
| | | B | no | 1.4 |
| | | | yes | — |
| 15 Ni/50 W/100 Al$_2$O$_3$ | I | A | no | 1.25 |
| | | | yes | 4.0 |
| | | B | no | 2.95 |
| | | | yes | 4.7 |
| | II | A | no | 1.0 |
| | | | yes | 3.0 |
| | | B | no | 1.85 |
| | | | yes | 3.6 |

When comparing the catalysts sulfided according to the invention (sulfiding method B) with catalysts sulfided by the conventional method (sulfiding method A), it is clear from Table B that the effect of the sulfiding according to the invention on the benzene hydrogenation activity of the catalysts is more favorable as the nickel content of the catalysts is higher. The effect of the nickel content is especially manifest in those cases where calcining method II has been used (maximum calcining temperature 700°C).

EXAMPLE III

In this Example the benzene hydrogenation activities of five Ni/Mo/Al$_2$O$_3$ catalysts sulfided by different methods, were compared. The catalysts which contained 6.6 parts by weight of nickel and 25.4 parts by weight of molybdenum per 100 parts by weight of alumina were prepared by impregnating an alumina carrier with an aqueous solution containing nickel nitrate and ammonium molybdate, the volume of which solution corresponded to the pore volume of the carrier. For the preparation of catalysts A-D the compositions were dried at 120°C, heated from 120°C to 175°C in 15 minutes and calcined by the calcining method III described below.

Calcining method III

The composition is heated from 175°C to 500°C in 2¾ hours and maintained at 500°C for 3 hours.

The compositions calcined as described above were subsequently sulfided. The sulfiding was effected by four different methods. In addition to the sulfiding methods A and B described above, the sulfiding methods C and D described below were applied.

Sulfiding method C (according to the invention)

This sulfiding method proceeds in a similar way as sulfiding method B, except that in this case water without additives is used instead of an aqueous phosphoric acid solution.

Sulfiding method D (according to the invention)

This sulfiding method proceeds in a similar way as sulfiding method B, except that in this case an aqueous 30% hydrogen peroxide solution is used instead of an aqueous phosphoric acid solution.

Starting from the composition from which the catalysts A-D had been prepared by drying, calcining and sulfiding, a fifth catalyst E was obtained by subjecting this composition to the sulfiding method E described below without a preceding drying or calcining step.

Sulfiding method E (according to Netherlands patent application No. 72.11116)

The composition which contains an amount of water corresponding to the pore volume of the carrier is treated with H$_2$S at 15 bar and 75°C for 16 hours and is subsequently heated to 400°C in 3½ hours in an H$_2$S/H$_2$ stream (1/10 v/v, 10 bar, 15,000 Nl.l$^{-1}$.h$^{-1}$).

The benzene hydrogenation activities of catalysts A-E are given in Table C.

Table C

| Catalyst | Calcining method | Sulfiding method | Benzene hydrogenation activity ml,ml$^{-1}$.h$^{-1}$ |
|---|---|---|---|
| A | III | C | 1.05 |
| B | III | D | 1.36 |
| C | III | B | 1.45 |
| D | III | A | 0.84 |

Table C-continued

| Catalyst | Calcining method | Sulfiding method | Benzene hydrogenation activity ml,ml$^{-1}$.h$^{-1}$ |
|---|---|---|---|
| E | no | E | 1.42 |

Table C shows that the catalysts A, B and C prepared according to the invention (wetting of the calcined catalyst followed by sulfiding) have a higher benzene hydrogenation activity than catalyst D which had been prepared by the conventional method (sulfiding of the unwetted calcined catalyst). The Table further shows that better results are obtained in the process according to the invention if a compound promoting the water solubility of the metals present in the composition is added to the water used for wetting the composition. This applies especially to phosphoric acid. If this compound is added to the water, catalysts are obtained of which the benzene hydrogenation activity is fully comparable with that of catalysts prepared according to Netherlands patent application No. 72.11116 (catalyst E).

EXAMPLE IV

In this Example the benzene hydrogenation activities of an Ni/Mo/Al$_2$O$_3$ catalyst and two Ni/W/Al$_2$O$_3$ catalysts, which had been sulfided by different methods, are compared. Per 100 parts by weight of alumina the catalysts contained 6.6 parts by weight of nickel and 25.4 parts by weight of molybdenum; 5 parts by weight of nickel and 50 parts by weight of tungsten, and 10 parts by weight of nickel and 60 parts by weight of tungsten. The catalysts were prepared by impregnating an alumina carrier with an aqueous solution containing nickel nitrate and ammonium molybdate or ammonium tungstate, the volume of which solution corresponded to the pore volume of the carrier. After drying at 120°C and heating from 120°C to 175°C in 15 minutes, the compositions were calcined by the calcining method III described above and subsequently sulfided. The sulfiding of the compositions was effected by two different methods, viz. by sulfiding method A (conventional) and by sulfiding method B (according to the invention), both described above.

The benzene hydrogenation activities of the catalysts are given in Table D.

Table D

| Catalyst | Sulfiding method | Benzene hydrogenation activity ml,ml$^{-1}$.h$^{-1}$ |
|---|---|---|
| 6.6 Ni/25.4 Mo/ Al$_2$O$_3$ | A | 0.84 |
|  | B | 1.45 |
| 5 Ni/50 W/Al$_2$O$_3$ | A | 1.0 |
|  | B | 2.5 |
| 10 Ni/60 W/Al$_2$O | A | 1.2 |
|  | B | 4.1 |

Table D also shows the favorable effect of sulfiding according to the invention on the benzene hydrogenation activity of the catalysts. Here again it manifest that the effect of the sulfiding is more favorable as the nickel content of the catalysts is higher.

EXAMPLE V

In this Example the benzene hydrogenation activities of five Ni/W/Al$_2$O$_3$ catalysts, which had been calcined and sulfided by different methods, are compared. The catalysts containing 5 parts by weight of nickel and 50 parts by weight of tungsten per 100 parts by weight of alumina were prepared by impregnating an alumina carrier with an aqueous solution containing nickel nitrate and ammonium tungstate, the volume of which solution corresponded to the pore volume of the carrier. After drying at 120°C and heating from 120°C to 175°C in 15 minutes, the compositions were calcined. The calcination was effected by five different methods. In addition to calcining methods I, II and III, calcining methods IV and V described below were used in this case.

Calcining method IV

The composition is heated from 175°C to 300°C in 2¾ hours and maintained at 300°C for 3 hours.

Calcining method V

The composition is heated from 175°C to 600°C in 2¾ hours and maintained at 600°C for 3 hours.

The calcined compositions were subsequently sulfided, for which the above-mentioned sulfiding methods A (conventional) and B (according to the invention) were used.

The benzene hydrogenation activities of the catalysts are given in Table E.

Table E

| Catalyst | Calcining method | Sulfiding method | Benzene hydrogenation activity ml,ml⁻¹.h⁻¹ |
| --- | --- | --- | --- |
| F | I | A | 1.4 |
|   |   | B | 3.1 |
| G | II | A | 1.1 |
|   |   | B | 1.4 |
| H | III | A | 1.0 |
|   |   | B | 2.5 |
| J | IV | A | 1.4 |
|   |   | B | 3.0 |
| K | V | A | — |
|   |   | B | 2.2 |

Table E shows that the favorable effect of the sulfiding according to the invention on the benzene hydrogenation activity of the catalysts is most prominent if the sulfiding is applied to a catalyst which has been subjected to a calcination in which the following requirements were met (cf. catalyst F):

a. heating rate from 175°C to 300°C at most 1.5°C/min.
b. maximum calcination temperature below 600°C
c. catalyst to be maintained at 300°C for some time before being heated further to the maximum calcining temperature.

What is claimed is:

1. A process for the preparation of catalysts comprising at least one sulfide of metals from the group consisting of nickel, cobalt, molybdenum and tungsten on a carrier, comprising
wetting with water a composition which contains one or more of the above-mentioned metals on a porous carrier and which has been calcined at a temperature between 175° and 700°C with decomposition of at least part of the metal salts used for applying the metals to the carrier;
treating the wetted composition with a hydrogen sulfide-containing gas at a temperature below 150°C, and
heating the product to a final temperature above 200°C, provided that the amount of water used for wetting the calcined composition corresponds to 20–120% of the amount of water the composition is capable of taking up within the pores of the carrier at 20°C after being wetted with water and dried in a dry gas at 110°C, provided that, if the calcined composition has a combined nickel and cobalt content of less than 4 parts by weight per 100 parts by weight of carrier, the calcination temperature does not exceed 600°C.

2. A process as in claim 1, wherein the catalyst comprises at least one sulfide of the metals nickel and cobalt and at least one sulfide of the metals tungsten and molybdenum.

3. A process as in claim 2, wherein the catalyst contains 0.02–0.2 gram atoms of nickel and at least one metal selected from cobalt and 0.04–0.4 gram-atoms of at least one metal selected from molybdenum and tungsten per 100 g of carrier.

4. A process as in claim 1, wherein the porous carrier is alumina or silica-alumina.

5. A process as in claim 1, wherein the composition is heated from 175°C to the maximum calcining temperature, which is at least 300°C–700°C, at a maximum rate of 1.5°C/min., and is subsequently maintained at the maximum calcining temperature for at least one hour.

6. A process as in claim 1, wherein the composition is heated from 175°C to an initial calcining temperature in the range of 275°–325°C, at a maximum rate of 1.5°C/min., is subsequently maintained at this initial calcining temperature for at least 15 minutes, whereupon it is heated from the first calcining temperature to a calcining temperature in the range of 450°–550°C, and is maintained at said maximum calcining temperature for at least one hour.

7. A process as in claim 6, wherein during the heating of the composition from the first calcining temperature to the maximum calcining temperature a higher heating rate is applied than during the preceding heating from 175°C to the initial calcining temperature, which higher heating rate does not, however, exceed 8°C/min.

8. A process as in claim 1, wherein the calcined composition is wetted with an amount of water corresponding to 70–105% of the amount of water the composition is capable of taking up within the pores of the carrier at 20°C after being wetted and dried in a dry gas at 110°C.

9. A process as in claim 1, wherein in the wetting step the calcined composition is wetted with an aqueous solution containing one or more compounds which promote the water-solubility of the metals present in the calcined composition which compounds are selected from the group consisting of phosphoric acid, phosphorous acid and hydrogen peroxide and the amount of said solution used for wetting the calcined composition corresponds to 20–120% of the amount of water said composition is capable of taking up within the pores of the carrier at 20°C after being wetted with water and dried in a gas at 110°C.

10. A process as in claim 1, wherein the treating step is conducted with a hydrogen sulfide-containing treating gas selected from hydrogen sulfide or a mixture of hydrogen sulfide with hydrogen or nitrogen and at a hydrogen sulfide partial pressure of 3–20 bar and a temperature of 20°–110°C.

* * * * *